(12) United States Patent
Wang (10) Patent No.: US 12,302,045 B2
(45) Date of Patent: May 13, 2025

(54) CONFIGURATION METHOD AND APPARATUS, BINDING METHOD AND APPARATUS, AND DEVICE, SENDING NODE, RECEIVING NODE AND MEDIUM

(71) Applicant: ZTE CORPORATION, Shenzhen (CN)

(72) Inventor: Qilei Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 149 days.

(21) Appl. No.: 18/013,470

(22) PCT Filed: May 31, 2021

(86) PCT No.: PCT/CN2021/097151
§ 371 (c)(1),
(2) Date: Dec. 28, 2022

(87) PCT Pub. No.: WO2022/001540
PCT Pub. Date: Jan. 6, 2022

(65) Prior Publication Data
US 2023/0283935 A1    Sep. 7, 2023

(30) Foreign Application Priority Data
Jun. 29, 2020    (CN) .......................... 202010610782.6

(51) Int. Cl.
*H04Q 11/00* (2006.01)
*H04J 3/16* (2006.01)

(52) U.S. Cl.
CPC ........ *H04Q 11/0067* (2013.01); *H04J 3/1652* (2013.01); *H04Q 2011/0086* (2013.01)

(58) Field of Classification Search
None
See application file for complete search history.

(56) References Cited

U.S. PATENT DOCUMENTS 7,826,745 B2 *  11/2010  DeCusatis ............... H04J 14/08
                                              398/35
9,847,847 B2 *  12/2017  Fu ...................... H04Q 11/0003
(Continued)

FOREIGN PATENT DOCUMENTS

CN    108513180 A    9/2018
CN    108632061 A    10/2018
(Continued)

OTHER PUBLICATIONS

Japanese Office Action in Application No. 2022-581559, dated Feb. 2, 2024, 10 pages including translation.
(Continued)

*Primary Examiner* — Jai M Lee
(74) *Attorney, Agent, or Firm* — Morgan, Lewis & Bockius LLP (57) ABSTRACT

Provided are a configuration method and apparatus, a binding method and apparatus, a device, a sending node, a receiving node, and a medium. The configuration method includes determining a multiplexing structure of an optical layer channel and configuring channel identification information for a target node according to the multiplexing structure. The channel identification information is used for instructing the target node to bind the optical layer channel.

15 Claims, 5 Drawing Sheets

```
┌─────────────────────────────────────────────────────────────┐
│  Determine a multiplexing structure of an optical layer channel  │──110
└─────────────────────────────────────────────────────────────┘
                              │
                              ▼
┌─────────────────────────────────────────────────────────────┐
│ Configure channel identification information for a target node according to │
│ the multiplexing structure, where the channel identification information is │──120
│    used for instructing the target node to bind the optical layer channel    │
└─────────────────────────────────────────────────────────────┘
```

(56) References Cited

U.S. PATENT DOCUMENTS

| | | | | |
|---|---|---|---|---|
| 11,967,992 B2* | 4/2024 | Su | ......................... | H04J 3/1658 |
| 11,979,693 B2* | 5/2024 | Wang | ..................... | H04J 3/1652 |
| 2015/0364228 A1 | 12/2015 | Zou et al. | | |
| 2016/0119076 A1 | 4/2016 | Gareau | | |
| 2019/0036632 A1 | 1/2019 | Gareau et al. | | |

FOREIGN PATENT DOCUMENTS

| | | |
|---|---|---|
| CN | 109600188 A | 4/2019 |
| CN | 109639388 A | 4/2019 |
| CN | 112511923 A | 3/2021 |
| JP | 2019534609 A | 11/2019 |
| WO | WO2017143518 A1 | 8/2017 |
| WO | WO2019062227 A1 | 4/2019 |

OTHER PUBLICATIONS

International Search Report in Application No. PCT/CN2021/097151, dated Aug. 26, 2021, 4 pages including translation.
Rodriguez-Moral et al: "Optical Data Networking: Protocols, Technologies, and Architectures for Next Generation Optical Transport Networks and Optical Internetworks", Journal of Lightwave Technology, IEEE, USA, vol. 18, No. 12, Dec. 2000, pp. 1855-1870.
"Flexible OTN short-reach interface Summary", ITU-T Draft ; Study Period 2013-2016, International Telecommunication Union, Geneva ; CH vol. 11/15, Nov. 21, 2016 (Nov. 21, 2016), pp. 1-24.
Extended European Search Report in Application No. 21831527.3, dated Jun. 17, 2024, 12 pages.
Japanese Office Action in Application No. 2022-581559, dated Aug. 13, 2024, 11 pages including translation.

\* cited by examiner

CONFIGURATION METHOD AND APPARATUS, BINDING METHOD AND APPARATUS, AND DEVICE, SENDING NODE, RECEIVING NODE AND MEDIUM

CROSS REFERENCE TO RELATED APPLICATIONS

This is a National Stage Application filed under 35 U.S.C. 371, based on International Patent Application No. PCT/CN2021/097151, filed on May 31, 2021, which claims priority to Chinese Patent Application No. 202010610782.6 filed with the China National Intellectual Property Administration (CNIPA) on Jun. 29, 2020, the disclosures of which are incorporated herein by reference in their entireties.

TECHNICAL FIELD

The present application relates to the field of fiber-optic communication, for example, to a configuration method and apparatus, a binding method and apparatus, a device, a sending node, a receiving node, and a medium.

BACKGROUND

Fiber-optic communication has characteristics such as high bandwidth, long transmission distance, and low loss, and has been widely deployed. Client signal flow in an electrical layer can be multiplexed into a signal in an optical layer for transmission. A completely standardized optical transport unit-Cn (OTUCn) signal can be divided into multiple flexible optical transport network (FlexO) physical channels. Each FlexO physical channel can be divided into multiple subchannels. Each sub-channel corresponds to a single physical interface through a separate optical time slot interchanger (OTSi) signal transmission. OTSi signals used in the optical transport network (OTN) interface standard have the same wavelength center frequency. However, the optical medium layer multiplexing standard does not involve subchannels and the correspondence between subchannels and physical interfaces. The composition method of the header overhead information of the optical medium layer is not applicable to the FlexO signal format defined in the OTN interface standard, different OTSi signals cannot be distinguished to be separately encapsulated, and information to support the multiplexing and demultiplexing of OTUCn signals are not provided sufficiently. Since multiplexing of optical layer channels cannot be effectively configured, nor binding of an optical channel or creation of an optical layer path can be accurately implemented, the reliability of the multiplexing of optical layer channels is low.

SUMMARY

The present application provides a configuration method and apparatus, a binding method and apparatus, a device, a sending node, a receiving node, and a medium to improve the reliability of the multiplexing of optical layer channels.

Embodiments of the present application provides a configuration method which includes determining the multiplexing structure of an optical layer channel and configuring channel identification information for a target node according to the multiplexing structure. The channel identification information is used for instructing the target node to bind the optical layer channel.

Embodiments of the present application provide a binding method applied by a sending node, which includes acquiring channel identification information, binding a local optical layer channel according to the channel identification information, encapsulating the channel identification information in header overhead, and sending the header overhead to a receiving node. The header overhead is used to instructing the receiving node to bind an optical layer channel.

Embodiments of the present application provide a binding method applied by a receiving node, which includes receiving header overhead, determining channel identification information according to the header overhead, and in the case where the channel identification information is successfully verified, binding a local optical layer channel according to the channel identification information.

Embodiments of the present application provide a binding method applied by a target node. The target node includes a sending node and a receiving node. The binding method applied by the target node includes acquiring channel identification information and binding a local optical layer channel according to the channel identification information.

Embodiments of the present application provide a configuration apparatus, which includes a structure determination module and a configuration module.

The structure determination module is configured to determine a multiplexing structure of an optical layer channel.

The configuration module is configured to configure channel identification information for a target node according to the multiplexing structure. The channel identification information is used for instructing the target node to bind the optical layer channel.

Embodiments of the present application provide a binding apparatus, which includes a first acquisition module, a first binding module, and an overhead sending module.

The first acquisition module is configured to acquire channel identification information.

The first binding module is configured to bind a local optical layer channel according to the channel identification information.

The overhead sending module is configured to encapsulate the channel identification information in header overhead and send the header overhead to a receiving node. The header overhead is used to instructing the receiving node to bind an optical layer channel.

Embodiments of the present application provide a binding apparatus, which includes an overhead reception module, an identification determination module, and a second binding module.

The overhead reception module is configured to receive header overhead.

The identification determination module is configured to determine channel identification information according to the header overhead.

The second binding module is configured to, in the case where the channel identification information is successfully verified, bind a local optical layer channel according to the channel identification information.

Embodiments of the present application provide a binding apparatus, which includes a second acquisition module and a third binding module.

The second acquisition module is configured to acquire channel identification information.

The third binding module is configured to bind a local optical layer channel according to the channel identification information.

Embodiments of the present application provide a device, which includes at least one processor and a storage apparatus.

The storage apparatus is configured to store at least one program.

When executed by the at least one processor, the at least one program causes the at least one processor to implement the preceding configuration method.

Embodiments of the present application provide a sending node. The sending node includes at least one processor and a storage apparatus.

The storage apparatus is configured to store at least one program.

When executed by the at least one processor, the at least one program causes the at least one processor to implement the preceding binding method applied by the sending node.

Embodiments of the present application provide a receiving node. The receiving node includes at least one processor and a storage apparatus.

The storage apparatus is configured to store at least one program.

When executed by the at least one processor, the at least one program causes the at least one processor to implement the preceding binding method applied by the receiving node.

Embodiments of the present application provide a computer-readable storage medium storing a computer program. The computer program, when executed by a processor, implements the preceding configuration method or the preceding binding method.

DETAILED DESCRIPTION

The present application is described hereinafter in conjunction with drawings and embodiments. It is to be understood that the embodiments described herein are intended to illustrate the present application and not to limit the present application. It is to be noted that if not in collision, embodiments of the present application and features therein may be combined with each other in any manner. Additionally, it is to be noted that for ease of description, only part, not all, of structures related to the present application are illustrated in the drawings.

In the process of mapping a client signal to an optical medium layer for transmission, the optical medium layer multiplexing standard does not involve subchannels of an optical layer channel and the correspondence between subchannels and physical interfaces. The composition method of the header overhead information of the optical medium layer is not applicable to the FlexO signal format defined in the OTN interface standard, different OTSi signals cannot be distinguished to be separately encapsulated, and information to support the multiplexing and demultiplexing of OTUCn signals are not provided sufficiently. Therefore, binding of an optical channel or creation of an optical layer path cannot be accurately implemented, resulting in that the reliability of the multiplexing of optical layer channels is low.

Embodiments of the present application provide a configuration method which can be applied by a network management device, a controller, and the like. A target node is, for example, a router, a transformer, a switch, or the like. The target node may be a sending node in a scenario with an overhead channel or may be a sending node and a receiving node in a scenario without an overhead channel. The following embodiments are described by taking a network management device as an example. By configuring channel identification information for a target node, the network management device implements accurate binding of an optical layer channel and provides a basis for correct multiplexing and demultiplexing of client signals.

Figure 1:
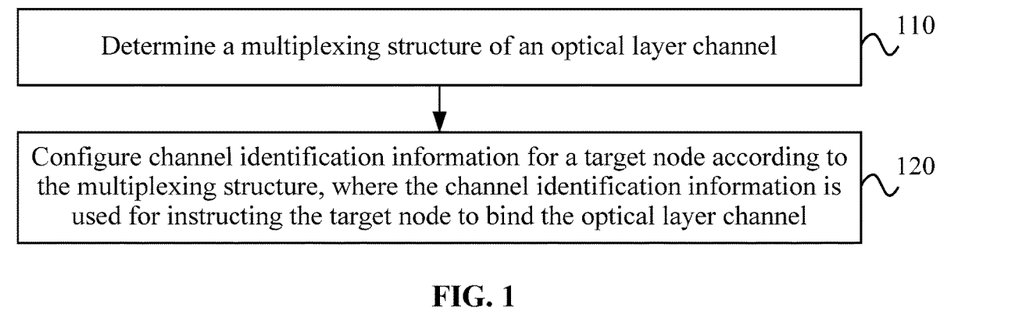
FIG. 1 is a flowchart of a configuration method according to an embodiment.

FIG. 1 is a flowchart of a configuration method according to an embodiment. As shown in FIG. 1, the method provided in this embodiment includes operation 110 and operation 120.

In operation 110, the multiplexing structure of an optical layer channel is determined.

In this embodiment, according to the multiplexing structure of the optical layer channel, a network management device can determine subchannels of the optical layer channel and the correspondence relationship between subchannels and physical interfaces. Accordingly, channel identification information is used for instructing a target node to bind the optical layer channel, implementing multiplexing of optical layer channels of the corresponding structure.

Figure 2:
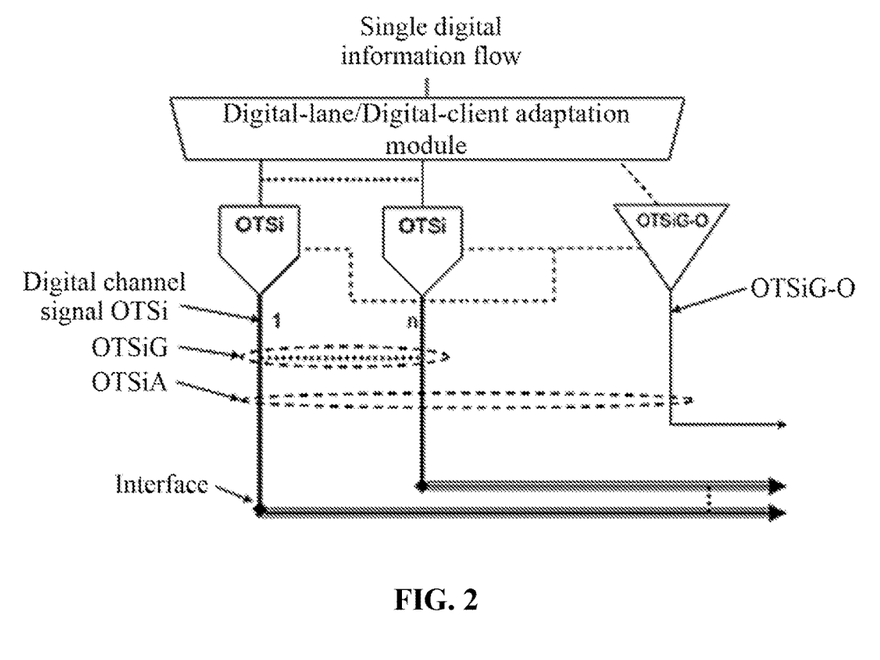
FIG. 2 is a schematic diagram of the multiplexing of optical layer channels according to an embodiment.

FIG. 2 is a schematic diagram of the multiplexing of optical layer channels according to an embodiment. As shown in FIG. 2, client signal flow in an electrical layer is multiplexed to a signal in an optical layer to implement signal transmission. Single digital information flow, as a single client, is input to a digital-lane/digital-client adaptation module, and after the adaptation module processes the single digital information flow, the adaptation module outputs multiple signals of digital lane, OTSis. These OTSis constitute an optical tributary signal group (OTSiG). Each OTSi is input to a corresponding OTSi modulator. Optical tributary signal group-overhead (OTSiG-O) is also output. The OTSiG-O carries the composition information of OTSis contained in the OTSiG. On this basis, the OTSiG and the OTSiG-O compose an optical tributary signal assembly (OTSiA). Each client signal, such as an optical transport unit-Cn (OTUCn) signal, may be divided into m FlexO physical channels according to actual interfaces on a device. Further, each FlexO physical channel is divided into k physical subchannels. Each physical subchannel is modulated to a separate OTSi for transmission. Each OTSi occupies a single fiber-optic link and corresponds to a single physical interface.

In operation 120, channel identification information is configured for a target node according to the multiplexing structure. The channel identification information is used for instructing the target node to bind the optical layer channel.

In this embodiment, channel identification information is configured for the target node, the multiplexing structure is indicated, and a basis is provided for binding the optical layer channel and establishing an optical layer path. The configured channel identification information may be transmitted through the header overhead of an optical communication network or delivered through a centralized controlled southbound interface protocol so that the target node finally completes multiplexing and demultiplexing of client signals. In a scenario with an overhead channel, the target node may refer to a sending node in the optical communication network. After receiving channel identification information, the sending node, on the one hand, implements binding of a local optical layer channel, and on the other hand, may send the channel identification information to a corresponding receiving node at the peer end so that the receiving node can complete binding of an optical layer channel. In a scenario without an overhead channel, the target node may include a sending node and a receiving node in the optical communication network. That is, a network management device configures and delivers channel identification information separately for the sending node and the receiving node. The sending node and the receiving node separately implement binding of an optical layer channel based on the channel identification information delivered by the network management device.

According to the configuration method in this embodiment, the channel identification information is configured for the target node, which enables the multiplexing of the optical layer channel is effectively configured, implementing accurate binding of the optical layer channel. Thus, a basis is provided for correct multiplexing and demultiplexing of client signals.

In an embodiment, the target node includes a sending node, and the sending node and a corresponding receiving node have an overhead channel used for transmitting the channel identification information.

This embodiment is provided for a scenario with an overhead channel. The overhead signal OTSiG-O is transmitted through a dedicated overhead channel. The overhead signal includes a piece of information about all OTSis composing of the OTSiG and the channel information used by these OTSis. The optical module of the Ethernet can be still used. Each OTSi occupies a separate fiber-optic link. The transmitter and receiver of an OTSi are generally not tunable. A fixed-frequency optical signal is used. The channel identification information may be used to identify the optical signal in the overhead channel.

Figure 3:
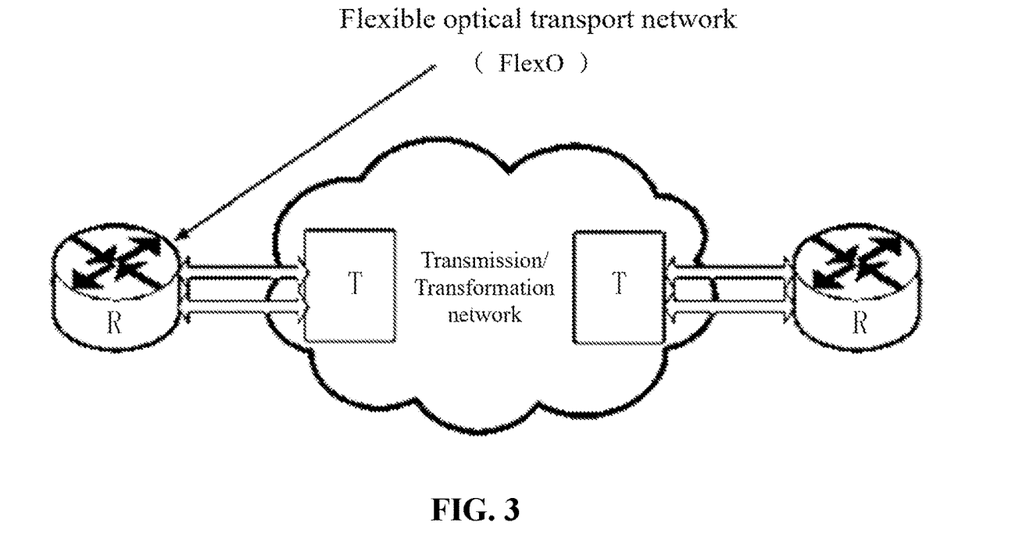
FIG. 3 is a schematic diagram illustrating the implementation of a configuration method in a scenario with an overhead channel according to an embodiment.

FIG. 3 is a schematic diagram illustrating the implementation of a configuration method in a scenario with an overhead channel according to an embodiment. As shown in FIG. 3, a target node is a sending node. Channel identification information configured by a network management device is transmitted to the sending node in the overhead channel. The sending node, on the one hand, implements binding of a local optical layer channel, and on the other hand, sends the channel identification information to a corresponding peer receiving node, so that the receiving node can complete binding of an optical layer channel.

In an embodiment, channel identification information includes the following information of a sending node: an optical layer adaptation interface local identifier, the number of channels contained in an optical layer, a channel local identifier, the number of subchannels contained in a channel, a subchannel local identifier, and a subchannel peer-end local identifier.

In this embodiment, in the overhead channel, the identification information of a channel composing an OTSiG and the identification information of a physical interface of a subchannel are carried in OTSiG-O. A local identifier and a peer-end local identifier are carried for the subchannel. After receiving the header overhead in the overhead channel, a receiving node first performs local verification according to the subchannel peer-end local identifier carried in the header overhead. When it is confirmed that the received subchannel peer-end local identifier is consistent with the local identifier, binding of the local channel and the local subchannel is performed, and an interface address at the channel level and an interface address at the OTSiA level are generated. Thus, an optical layer path is created, and a basis is provided for signal multiplexing and demultiplexing.

TABLE 1

Information table of channel identification
information configured for a sending node Optical layer adaptation interface local identifier
Number of channels contained in an optical layer
Channel #1 local identifier
Number of subchannels contained in channel #1
Channel # 1 contains the number of sub-channels
Subchannel #1.1 local identifier
Subchannel #1.1 peer-end local identifier
Subchannel #1.1 Remote Local Identifier
Subchannel #1.2 local identifier
Sub-channel #1.2 local identifier
Subchannel #1.2 peer-end local identifier
Subchannel #1.2 Remote Local Identifier
...
Subchannel #1.k local identifier
Subchannel #1.k local identifier
Subchannel #1.k peer-end local identifier
Subchannel #1.k Remote Local Identifier
Channel #2 local identifier
Channel # 2 local identifier
Number of subchannels contained in channel #2
Channel # 2 contains the number of sub-channels
Subchannel #2.1 local identifier
Subchannel #2.1 local identifier
Subchannel #2.1 peer-end local identifier
Sub-channel #2.1 peer-end local identifier
Subchannel #2.2 local identifier
Subchannel #2.2 local identifier
Subchannel #2.2 peer-end local identifier
Subchannel #2.2 Remote Local Identifier
...
Subchannel #2.k local identifier
Sub-channel #2.k local identifier
Subchannel #2.k peer-end local identifier
Subchannel #2.k Remote Local Identifier
...
...
Channel #m local identifier
Channel #m local identifier
Number of subchannels contained in channel #m
The number of sub-channels included in the channel #m
Subchannel #m. 1 local identifier
Subchannel #m. 1 local identifier
Subchannel #m. 1 peer-end local identifier
Subchannel #m.1 Remote Local Identifier
Subchannel #m.2 local identifier
Sub-channel #m.2 local identifier
Subchannel #m.2 peer-end local identifier
Subchannel #m.2 Remote Local Identifier TABLE 1-continued Information table of channel identification
information configured for a sending node ...
...
Subchannel #m.k local identifier
Subchannel #m.k Local Identifier
Subchannel #m.k peer-end local identifier
Subchannel #m.k Remote Local Identifier Table 1 is an information table of channel identification information configured for the sending node provided in an embodiment. As shown in Table 1, the channel identification information includes the following information:
- an optical layer adaptation interface local identifier: appearing externally as a separate interface when signals of all optical layer channels are bound together, to which, electrical signals of the upper client layer forward information data flow, to completing the channel division of signals in the electrical layer, and modulate the corresponding optical module interface to transmit optical signals;
- the number of channels contained in an optical layer: denoting the number of divided channels at a first level, that is, the number of FlexO instances into which an OTUCn is divided;
- a channel #m local identifier: denoting the local identifier of the local interface of a channel #m;
- the number of subchannels contained in a channel #m: denoting the number of divided subchannels at a second level, that is, the number of subchannels divided by each FlexO instance;
- a subchannel #m.k local identifier: denoting the local identifier of a subchannel k under a channel #m; and
- a subchannel #m.k peer-end local identifier: denoting the peer-end local identifier of a subchannel k under a channel #m, corresponding to the local identifier of a subchannel k under a channel #m, and uniquely identifying a fiber-optic link at the subchannel level.

As shown in FIG. 3, a FlexO link between a router (R) node and a transformer (T) node on the left is taken as an example. In a scenario with an overhead channel, the interaction process between the network management device and the router node (that is, a sending node) and the interaction flow between the network management device and the transformer node (that is, a receiving node) are as follows.

(1) The network management device configures channel identification information for the router node according to the multiplexing structure of an optical layer channel. The channel identification information contains a subchannel peer-end local identifier.

(2) According to the configuration of the network management device, the router node completes binding of interfaces at the local subchannel level and at the channel level. Then, the channel identification information shown in Table 1 is encapsulated in header overhead and sent to the transformer node on the peer end.

(3) The transformer node receives and decapsulates the header overhead encapsulated in the overhead channel, and recovers OTSiG-O. Accordingly, it is verified whether the subchannel peer-end local identifier in the OTSiG-O is consistent with a local identifier. When the verification result is being inconsistent, error information is returned. When the verification result is being consistent, binding interfaces at the local subchannel level is completed. Channels are formed. Interface addresses at the channel level are created. Binding of interfaces at the channel level is completed. Interface addresses at the OTSiA level are created. Thus, configuration of OTSiA connection is completed. The configured address of the interface addresses at the channel level and the interface addresses at the OTSiA level can be advertised to the peer end through negotiation and interaction between two ends of the link.

In an embodiment, the target node includes a sending node and a receiving node. Configuring channel identification information to the target node according to the multiplexing structure includes configuring corresponding channel identification information for each target node according to the multiplexing structure.

In this embodiment, in a scenario without an overhead channel for transmitting header overhead between the receiving node and the sending node, the sending node of OTSiG and the receiving node of OTSiG can be configured separately by a network management device. Based on the method for composing channels of the OTSiG and subchannels of the OTSiG, client signals in the electrical layer are correctly encapsulated and decapsulated, and the configuration and establishment of an optical layer path are completed. Based on respective received channel identification information, the sending node and the receiving node complete binding of interfaces at the local subchannel level to form m channels and set an interface identifier for each channel, and the sending node and the receiving node complete the binding at the channel level to form an OTSiG and set an OTSiG interface identifier.

Figure 4:
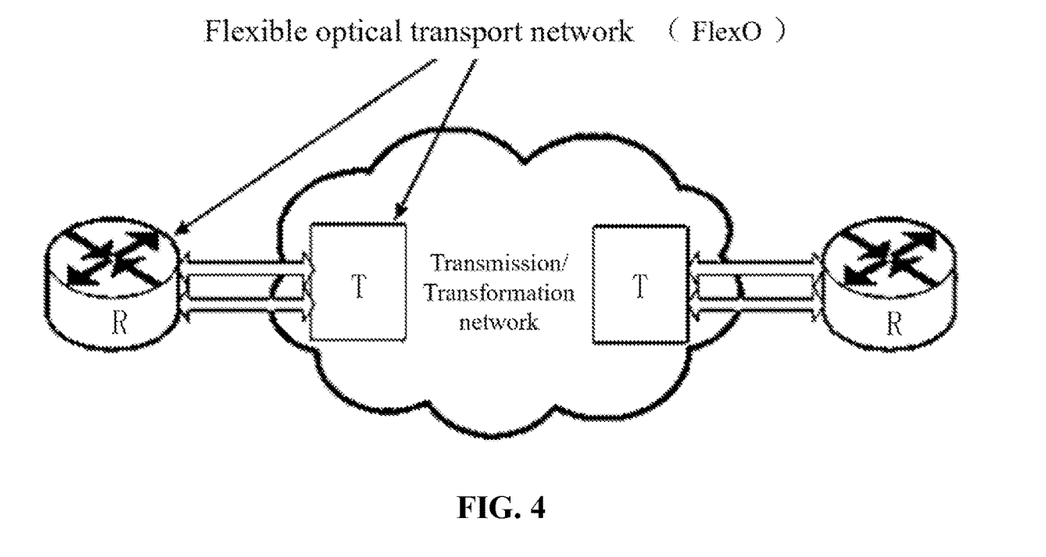
FIG. 4 is a schematic diagram illustrating the implementation of a configuration method in a scenario without an overhead channel according to an embodiment.

FIG. 4 is a schematic diagram illustrating the implementation of a configuration method in a scenario without an overhead channel according to an embodiment. As shown in FIG. 4, a target node is a sending node and a receiving node. A network management device configures and delivers channel identification information separately for the sending node and the receiving node. The sending node and the receiving node separately implement binding of local channels and subchannels.

In an embodiment, channel identification information corresponding to a target node includes the following information of the target node: an optical layer adaptation interface local identifier, the number of channels contained in an optical layer, a channel local identifier, the number of subchannels contained in a channel, and a subchannel local identifier.

In this embodiment, the network management device may separately deliver channel identification information to the sending node of OTSiG and the receiving node of OTSiG through a southbound interface protocol so that the sending node and the receiving node can perform signal multiplexing and demultiplexing. The network management device manages interconnection topology information of inter-domain links, and channel identification information corresponding to each target node merely needs to contain the local identifier of a local channel or subchannel and does not need to contain a peer-end interface identifier, as well as that header overhead does not need to be transmitted and the channel identification information does not need to be verified. Thus, the efficiency of binding of an optical layer channel is improved.

Table 2 is an information table of channel identification information configured for a sending node or a receiving node provided in an embodiment. The following information is shown in Table 2:

an optical layer adaptation interface local identifier: appearing externally as a separate interface when signals of all optical layer channels are bound together, to which, electrical signals of the upper client layer forward information data flow, to completing the channel division of signals in the electrical layer, and modulate the corresponding optical module interface to transmit optical signals;

the number of channels contained in an optical layer: denoting the number of divided channels at a first level, that is, the number of FlexO instances into which an OTUCn is divided;

a channel #m local identifier: denoting the local identifier of the local interface of a channel #m;

the number of subchannels contained in a channel #m: denoting the number of divided subchannels at a second level, that is, the number of subchannels divided by each FlexO instance; and a subchannel #m.k local identifier: denoting the local identifier of a subchannel k under a channel #m.

TABLE 2

Information table of channel identification information configured for a sending node or a receiving node Optical layer adaptation interface local identifier
Number of channels contained in an optical layer
Channel #1 local identifier
Number of subchannels contained in channel #1
Subchannel #1.1 local identifier
Subchannel #1.2 local identifier
...
Subchannel #1.k local identifier
Number of subchannels contained in channel #2
Subchannel #2.1 local identifier
Subchannel #2.2 local identifier
...
Subchannel #2.k local identifier
...
Number of subchannels contained in channel #m
Subchannel #m.1 local identifier
Subchannel #m.2 local identifier
...
Subchannel #m.k local identifier As shown in FIG. 4, a FlexO link between a router (R) node and a transformer (T) node on the left is taken as an example. In a scenario without an overhead channel, the interaction flow between the network management device and the router node (that is, a sending node) and the interaction flow between the network management device and the transformer node (that is, a receiving node) are as follows.

(1) The network management device configures and delivers channel identification information separately for the router node and the transformer node according to the multiplexing structure of an optical layer channel.

(2) According to the delivered channel identification information, the router node and the transformer node separately complete binding of interfaces at the local subchannel level to form channels, create interface addresses at the channel level, and set an interface identifier for each channel. Moreover, the router node and the transformer node separately complete the binding of interfaces at the channel level to form an OTSiG and set an OTSiG interface identifier. Then, an interface address at the OTSiA layer is created, the configuration of OTSiA connection is completed, and the establishment of an optical layer path is implemented.

The preceding embodiments implement the configuration of channel identification information and the binding of an optical layer channel in a scenario with an overhead channel and in a scenario without an overhead channel, the flexibility of the configuration is improved, and a reliable basis for the binding of an optical layer channel is provided.

Figure 5:
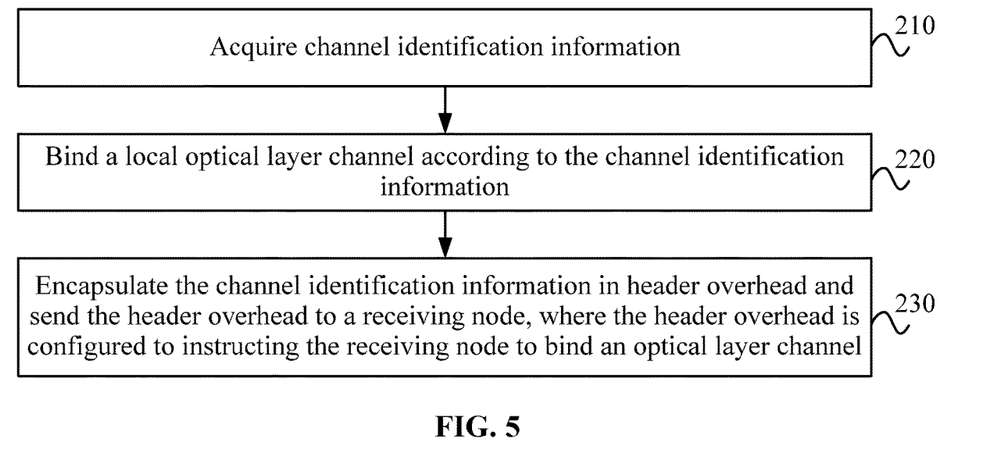
FIG. 5 is a flowchart of a binding method according to an embodiment.

FIG. 5 is a flowchart of a binding method according to an embodiment. The method is applicable to the case with an overhead channel and can be applied by a sending node. As shown in FIG. 5, the method according to this embodiment includes operations 210 to 230.

In operation 210, channel identification information is acquired.

In operation 220, a local optical layer channel is bound according to the channel identification information.

In operation 230, the channel identification information is encapsulated in header overhead, and the header overhead is sent to a receiving node. The header overhead is used to instructing the receiving node to bind an optical layer channel.

In this embodiment, on the one hand, the sending node acquires the channel identification information configured by a network management device, to implement the binding of the local optical layer channel. On the other hand, the sending node encapsulates and sends the channel identification information to a corresponding receiving node on the peer end so that the receiving node can complete the binding of the optical layer channel, implementing the accurate binding of the optical layer channel. Thus, a basis is provided for correct multiplexing and demultiplexing of client signals.

In an embodiment, channel identification information includes the following information of the sending node: an optical layer adaptation interface local identifier, the number of channels contained in an optical layer, a channel local identifier, the number of subchannels contained in a channel, a subchannel local identifier, and a subchannel peer-end local identifier.

In this embodiment, in the overhead channel, the identification information of a channel composing an OTSiG and the identification information of a physical interface of a subchannel are carried by OTSiG-O. A local identifier and a peer-end local identifier are carried for the subchannel. Thus, a basis is provided for verifying the channel identification information, and the accuracy and reliability of the binding of the optical layer channel are ensured.

In this embodiment, the operations executed by the sending node correspond to the operations executed by the network management device in the scenario with an overhead channel in the preceding embodiments. For technical details not described in detail in this embodiment, reference may be made to any one of the preceding embodiments.

Figure 6:
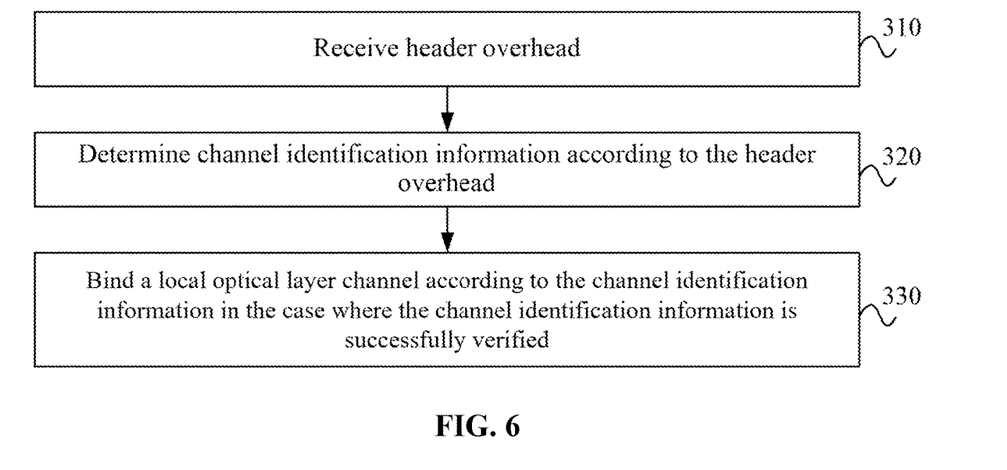
FIG. 6 is another flowchart of a binding method according to an embodiment.

FIG. 6 is another flowchart of a binding method according to an embodiment. The method is applicable to the case with an overhead channel and can be applied by a receiving node. As shown in FIG. 6, the method according to this embodiment includes operations 310 to 330.

In operation 310, header overhead is received.

In operation 320, channel identification information is determined according to the header overhead.

In operation 330, in the case where the channel identification information is successfully verified, a local optical layer channel is bound according to the channel identification information.

In this embodiment, the sending node encapsulates the channel identification information in the header overhead and sends the channel identification information to the corresponding receiving node at the peer end. After receiving the header overhead in the overhead channel, the receiving node performs local verification according to a subchannel peer-end local identifier carried in the header overhead. When it is determined that the received subchannel peer-end local identifier is consistent with a local identifier, the binding of the local channel and the local subchannel is performed, and an interface address at the channel level and an interface address at the OTSiA level are generated. Thus, an optical layer path is created, accurate binding of the optical layer channel is implemented, the reliability of binding is improved, and a basis is provided for signal multiplexing and demultiplexing.

In an embodiment, channel identification information includes the following information of a sending node: an optical layer adaptation interface local identifier, the number of channels contained in an optical layer, a channel local identifier, the number of subchannels contained in a channel, a subchannel local identifier, and a subchannel peer-end local identifier.

In this embodiment, in the overhead channel, the identification information of a channel composing an OTSiG and the identification information of a physical interface of a subchannel are carried by OTSiG-O. The local identifier and the peer-end local identifier are carried for the subchannel.

In an embodiment, operation 321 is further included.

In operation 321, the channel identification information is verified. In the case where in the channel identification information, the subchannel peer-end local identifier of the sending node is consistent with the subchannel local identifier of the receiving node, the channel identification information is successfully verified.

In this embodiment, the receiving node receives and decapsulates the header overhead encapsulated in the overhead channel and recovers the OTSiG-O. Accordingly, it is successfully verified whether the subchannel peer-end local identifier in the OTSiG-O is consistent with the local identifier. If the verification result is inconsistent, error information is returned. If the verification result is consistent, binding of interfaces at the local subchannel level is completed, interface addresses at the channel level are created, binding of interfaces at the channel level is completed, an optical layer path is created, and the reliability and accuracy of binding of the optical layer channel are improved.

In this embodiment, the operations executed by the receiving node correspond to the operations executed by the sending node in the scenario with an overhead channel in the preceding embodiments. For technical details not described in detail in this embodiment, reference may be made to any one of the preceding embodiments.

Figure 7:
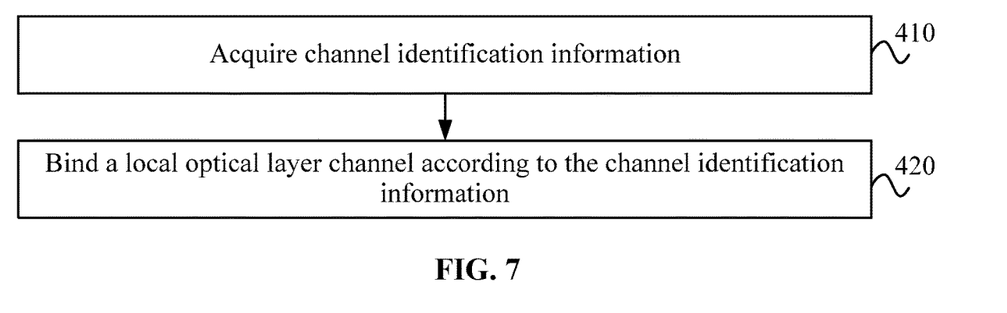
FIG. 7 is another flowchart of a binding method according to an embodiment.

FIG. 7 is another flowchart of a binding method according to an embodiment. The method is applicable to the case with no overhead channel and can be applied by a sending node or a receiving node. As shown in FIG. 7, the method provided in this embodiment includes operation 410 and operation 420.

In operation 410, channel identification information is acquired.

In operation 420, a local optical layer channel is bound according to the channel identification information.

In this embodiment, in a scenario without an overhead channel for transmitting header overhead between a receiving node and a sending node, the sending node of OTSiG and the receiving node of OTSiG can be configured separately by a network management device. Based on the method for composing channels of the OTSiG and subchannels of the OTSiG, client signals in the electrical layer are correctly encapsulated and decapsulated, and the configuration and establishment of an optical layer path are completed. Based on respective received channel identification information, the sending node and the receiving node complete binding of interfaces at the local subchannel level to form m channels and set an interface identifier for each channel, and the sending node and the receiving node complete the binding at the channel level to form an OTSiG and set an OTSiG interface identifier. Thus, accurate binding of the optical layer channel is implemented, providing a basis for correct multiplexing and demultiplexing of client signals.

In an embodiment, channel identification information includes the following information of the target node: an optical layer adaptation interface local identifier, the number of channels contained in an optical layer, a channel local identifier, the number of subchannels contained in a channel, and a subchannel local identifier.

In this embodiment, the network management device may separately deliver channel identification information to the sending node of OTSiG and the receiving node of OTSiG through a southbound interface protocol so that the sending node and the receiving node can perform signal multiplexing and demultiplexing. The network management device manages interconnection topology information of inter-domain links. Channel identification information corresponding to each target node merely needs to contain the local identifier of a local channel or subchannel and does not need to contain a peer-end interface identifier. Header overhead does not need to be transmitted, and the channel identification information does not need to be verified. Thus, the efficiency of binding of an optical layer channel is improved.

Figure 8:
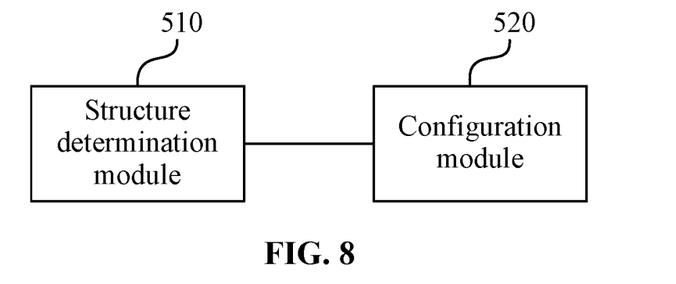
FIG. 8 is a schematic diagram of a configuration apparatus according to an embodiment.

Embodiments of the present application provide a configuration apparatus. FIG. 8 is a schematic diagram of a configuration apparatus according to an embodiment. As shown in FIG. 8, the configuration apparatus includes a structure determination module 510 and a configuration module 520.

The structure determination module 510 is configured to determine the multiplexing structure of an optical layer channel.

The configuration module 520 is configured to configure channel identification information for a target node according to the multiplexing structure. The channel identification information is used for instructing the target node to bind the optical layer channel.

In this embodiment, the configuration apparatus configures the channel identification information for the target node and effectively configures multiplexing of the optical layer channel, implementing accurate binding of the optical layer channel. Thus, a basis is provided for correct multiplexing and demultiplexing of client signals.

In an embodiment, the target node includes a sending node, and the sending node and a corresponding receiving node have an overhead channel used for transmitting the channel identification information.

In an embodiment, the channel identification information includes the following information of the sending node: an optical layer adaptation interface local identifier, the number of channels contained in an optical layer, a channel local identifier, the number of subchannels contained in a channel, a subchannel local identifier, and a subchannel peer-end local identifier.

In an embodiment, the target node includes a sending node and a receiving node.

The configuration module 520 is specifically configured to configure corresponding channel identification information for each target node according to the multiplexing structure.

In an embodiment, channel identification information corresponding to a target node includes the following information of the target node: an optical layer adaptation interface local identifier, the number of channels contained in an optical layer, a channel local identifier, the number of subchannels contained in a channel, and a subchannel local identifier.

The configuration apparatus provided in this embodiment and the configuration methods provided in the preceding embodiments belong to the same concept. For technical details not described in detail in this embodiment, reference may be made to any one of the preceding embodiments, and this embodiment has the same beneficial effects as the configuration method executed.

Figure 9:
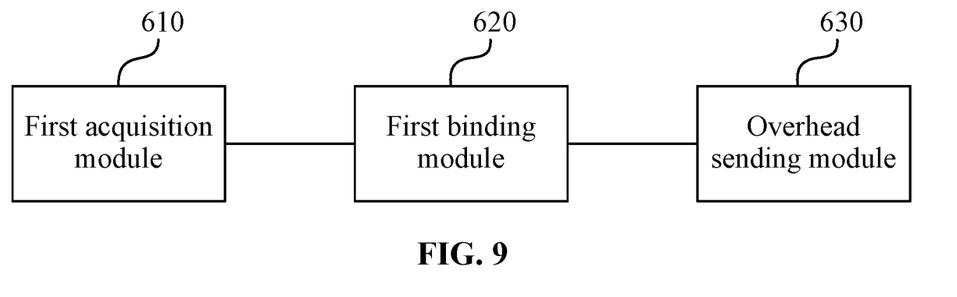
FIG. 9 is a schematic diagram of a binding apparatus according to an embodiment.

Embodiments of the present application provide a binding apparatus. FIG. 9 is a schematic diagram of a binding apparatus according to an embodiment. As shown in FIG. 9, the binding apparatus includes a first acquisition module 610, a first binding module 620, and an overhead sending module 630.

The first acquisition module 610 is configured to acquire channel identification information.

The first binding module 620 is configured to bind a local optical layer channel according to the channel identification information.

The overhead sending module 630 is configured to encapsulate the channel identification information in header overhead and send the header overhead to a receiving node. The header overhead is used to instructing the receiving node to bind an optical layer channel.

In this embodiment, on the one hand, the binding apparatus acquires the channel identification information configured by a network management device, implementing the binding of the local optical layer channel. On the other hand, the binding apparatus encapsulates and sends the channel identification information to the corresponding receiving node at the peer end so that the receiving node can complete the binding of the optical layer channel, implementing the accurate binding of the optical layer channel. Thus, a basis is provided for correct multiplexing and demultiplexing of client signals.

In an embodiment, the channel identification information includes the following information of the sending node: an optical layer adaptation interface local identifier, the number of channels contained in an optical layer, a channel local identifier, the number of subchannels contained in a channel, a subchannel local identifier, and a subchannel peer-end local identifier.

The binding apparatus provided in this embodiment and the binding methods applied by the sending node provided in the preceding embodiments belong to the same concept. For technical details not described in detail in this embodiment, reference may be made to any one of the preceding embodiments, and this embodiment has the same beneficial effects as the executed binding method applied by a sending node.

Figure 10:
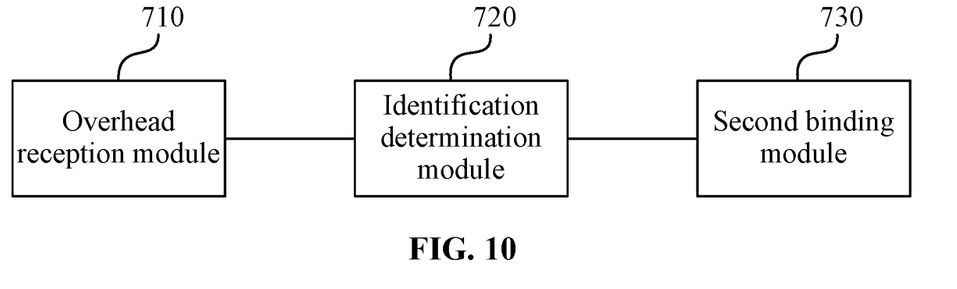
FIG. 10 is another schematic diagram of a binding apparatus according to an embodiment.

Embodiments of the present application provide a binding apparatus. FIG. 10 is another schematic diagram of a binding apparatus according to an embodiment. As shown in FIG. 10, the binding apparatus includes an overhead reception module 710, an identification determination module 720, and a second binding module 730.

The overhead reception module 710 is configured to receive header overhead.

The identification determination module 720 is configured to determine channel identification information according to the header overhead.

The second binding module 730 is configured to, in the case where the channel identification information is successfully verified, bind a local optical layer channel according to the channel identification information.

In this embodiment, after receiving the header overhead in an overhead channel, the binding apparatus performs local verification according to the subchannel peer-end local identifier carried in the header overhead. When it is determined that the received subchannel peer-end local identifier is consistent with a local interface identifier, binding of the local channel and the local subchannel is performed, and an interface address at the channel level and an interface address at the OTSiA level are generated. Thus, an optical layer path is created, accurate binding of the optical layer channel is implemented, the reliability of binding is improved, and a basis is provided for signal multiplexing and demultiplexing.

In an embodiment, the channel identification information includes the following information of a sending node: an optical layer adaptation interface local identifier, the number of channels contained in an optical layer, a channel local identifier, the number of subchannels contained in a channel, a subchannel local identifier, and a subchannel peer-end local identifier.

In an embodiment, a verification module is included.

The verification module is configured to verify the channel identification information.

In the case where in the channel identification information, the subchannel peer-end local identifier of the sending node is consistent with the subchannel local identifier of the receiving node, the channel identification information is successfully verified.

The binding apparatus provided in this embodiment and the binding methods applied by the receiving node provided in the preceding embodiments belong to the same concept. For technical details not described in detail in this embodiment, reference may be made to any one of the preceding embodiments, and this embodiment has the same beneficial effects as the executed binding method applied by a receiving node.

Figure 11:
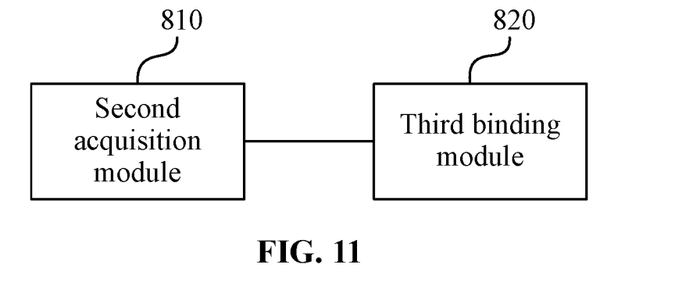
FIG. 11 is another schematic diagram of a binding apparatus according to an embodiment.

Embodiments of the present application provide a binding apparatus. FIG. 11 is another schematic diagram of a binding apparatus according to an embodiment. As shown in FIG. 11, the binding apparatus includes a second acquisition module 810 and a third binding module 820.

The second acquisition module 810 is configured to acquire channel identification information.

The third binding module 820 is configured to bind a local optical layer channel according to the channel identification information.

In this embodiment, based on the received channel identification information, the binding apparatus implements accurate binding of the optical layer channel and improves the efficiency of binding of the optical layer channel.

In an embodiment, the channel identification information includes the following information of the target node: an optical layer adaptation interface local identifier, the number of channels contained in an optical layer, a channel local identifier, the number of subchannels contained in a channel, and a subchannel local identifier.

The binding apparatus provided in this embodiment and the binding methods applied by the target node (including the sending node and the receiving node) provided in the preceding embodiments belong to the same concept. For technical details not described in detail in this embodiment, reference may be made to any one of the preceding embodiments, and this embodiment has the same beneficial effects as the executed binding method applied by a target node.

Embodiments of the present application provide a device. The configuration method may be executed by a configuration apparatus which may be implemented by software and/or hardware and integrated in the device. The device is, for example, a network management device or a controller.

Figure 12:
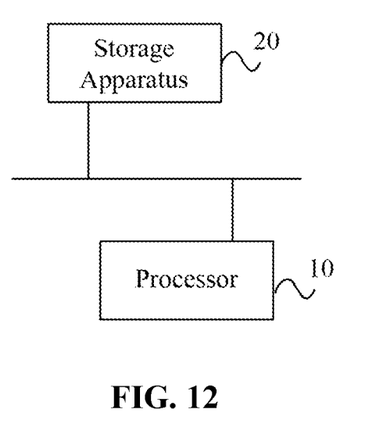
FIG. 12 is a hardware schematic diagram of a device according to an embodiment.

FIG. 12 is a hardware schematic diagram of a device according to an embodiment. As shown in FIG. 12, the device provided in this embodiment includes a processor 10 and a storage apparatus 20. The device may include at least one processor 10. One processor 10 is taken as an example in FIG. 12. The processor 10 and the storage apparatus 20 in the device may be connected via a bus or in other manners. The connection via a bus is taken as an example in FIG. 12.

When executed by the at least one processor 10, the at least one program causes the at least one processor 10 to implement the configuration method of any embodiment described above.

The storage apparatus 20 in the device, as a computer-readable storage medium, may be configured to store at least one program which may be software programs, computer-executable programs and modules, such as program instructions/modules (for example, modules in the configuration apparatus, which include the structure determination module 510 and the configuration module 520, as shown in FIG. 8) corresponding to the configuration method in embodiments of the present disclosure. The processor 10 runs the software programs, instructions, and modules stored in the storage apparatus 20 to execute function applications and data processing of the device, that is, to implement the configuration methods in the preceding method embodiments.

The storage apparatus 20 mainly includes a program storage region and a data storage region. The program storage region may store an operating system and an application program required by at least one function. The data storage region may store data (such as the channel identification information and the multiplexing structure in the preceding embodiments) created based on use of the device. Additionally, the storage apparatus 20 may include a high-speed random-access memory and may further include a nonvolatile memory, such as at least one magnetic disk memory, a flash memory, or another nonvolatile solid-state memory. In some examples, the storage apparatus 20 may further include memories which are remotely disposed with respect to the processor 10, and these remote memories may be connected to the device via a network. Examples of the preceding network include, but are not limited to, the Internet, an intranet, a local area network, a mobile communication network and a combination thereof.

When the at least one program included in the preceding device are executed by the at least one processor 10, the following operations are implemented: determining the multiplexing structure of an optical layer channel and configuring channel identification information for a target node according to the multiplexing structure. The channel identification information is used for instructing the target node to bind the optical layer channel.

The device provided in this embodiment and the configuration methods provided in the preceding embodiments belong to the same concept. For technical details not described in detail in this embodiment, reference may be made to any one of the preceding embodiments, and this embodiment has the same beneficial effects as the configuration method executed.

Embodiments of the present application provide a sending node. In the preceding embodiments, the binding method applied by a sending node may be executed by a binding apparatus which may be implemented by software and/or hardware and integrated in the sending node. The sending node is, for example, a router, a transformer, or a switch.

Figure 13:
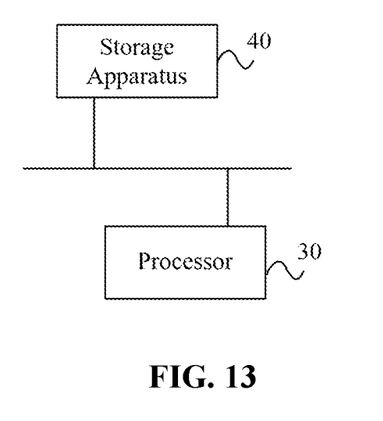
FIG. 13 is a hardware schematic diagram of a sending node according to an embodiment.

FIG. 13 is a hardware schematic diagram of a sending node according to an embodiment. As shown in FIG. 13, the sending node provided in this embodiment includes a processor 30 and a storage apparatus 40. The sending node may include at least one processor 30. One processor 30 is taken as an example in FIG. 13. The processor 30 and the storage apparatus 40 in the device may be connected via a bus or in other manners. The connection via the bus is taken as an example in FIG. 13.

When executed by the at least one processor 30, the at least one program causes the at least one processor 30 to implement the binding method applied by a sending node in any embodiment described above.

The storage apparatus 40 in the sending node, as a computer-readable storage medium, may be configured to store at least one program which may be software programs, computer-executable programs, and modules, such as program instructions/modules (for example, modules in the binding apparatus, which include a first acquisition module 610, a first binding module 620, and an overhead sending module 630, as shown in FIG. 9) corresponding to the binding method applied by a sending node in embodiments of the present disclosure. The processor 30 runs the software programs, instructions, and modules stored in the storage apparatus 40 to execute function applications and data processing of the sending node, that is, to implement the binding methods in the preceding method embodiments.

The storage apparatus 40 mainly includes a program storage region and a data storage region. The program storage region may store an operating system and an application program required by at least one function. The data storage region may store data (such as the channel identification information and the header overhead in the preceding embodiments) created based on use of the device. Additionally, the storage apparatus 40 may include a high-speed random-access memory and may further include a nonvolatile memory, such as at least one magnetic disk memory, a flash memory, or another nonvolatile solid-state memory. In some examples, the storage apparatus 40 may further include memories which are remotely disposed with respect to the processor 30, and these remote memories may be connected to the sending node via a network. Examples of the preceding network include, but are not limited to, the Internet, an intranet, a local area network, a mobile communication network and a combination thereof.

When the at least one program included in the preceding sending node are executed by the at least one processor 30, the following operations are implemented: acquiring channel identification information; binding a local optical layer channel according to the channel identification information; and encapsulating the channel identification information in header overhead, and sending the header overhead to a receiving node. The header overhead is used to instructing the receiving node to bind an optical layer channel.

Alternatively, when the at least one program included in the preceding sending node are executed by the at least one processor 30, the following operations are implemented:

acquiring channel identification information and binding a local optical layer channel according to the channel identification information.

The sending node provided in this embodiment and the binding methods applied by a sending node provided in the preceding embodiments belong to the same concept. For technical details not described in detail in this embodiment, reference may be made to any one of the preceding embodiments, and this embodiment has the same beneficial effects as the executed binding method applied by a sending node.

Embodiments of the present application provide a receiving node. In the preceding embodiments, the binding method applied by a receiving node may be executed by a binding apparatus which may be implemented by software and/or hardware and integrated in the receiving node. The receiving node is, for example, a router, a transformer, or a switch.

Figure 14:
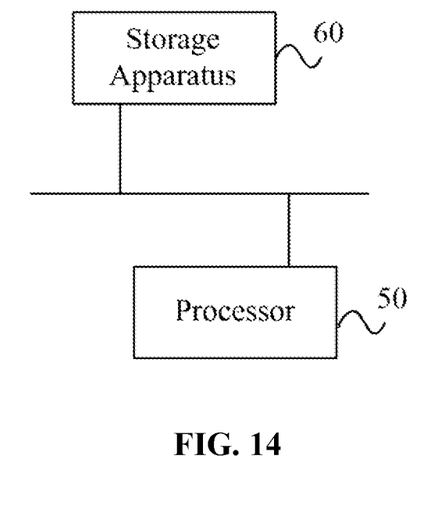
FIG. 14 is a hardware schematic diagram of a receiving node according to an embodiment.

FIG. 14 is a hardware schematic diagram of a receiving node according to an embodiment. As shown in FIG. 14, the receiving node provided in this embodiment includes a processor 50 and a storage apparatus 60. The receiving node may include at least one processor 50. One processor 50 is taken as an example in FIG. 14. The processor 50 and the storage apparatus 60 in the device may be connected via a bus or in other manners. The connection via the bus is taken as an example in FIG. 14.

When executed by the at least one processor 50, the at least one program causes the at least one processor 50 to implement the binding method applied by a receiving node in any embodiment described above.

The storage apparatus 60 in the receiving node, as a computer-readable storage medium, may be configured to store at least one program which may be software programs, computer-executable programs and modules, such as program instructions/modules (for example, modules in the binding apparatus, which include an overhead reception module 710, an identification determination module 720, and a second binding module 730, as shown in FIG. 10) corresponding to the binding method applied by a receiving node in embodiments of the present disclosure. The processor 50 runs the software programs, instructions, and modules stored in the storage apparatus 60 to execute function applications and data processing of the receiving node, that is, to implement the binding methods in the preceding method embodiments.

The storage apparatus 60 mainly includes a program storage region and a data storage region. The program storage region may store an operating system and an application program required by at least one function. The data storage region may store data (such as the channel identification information and the header overhead in the preceding embodiments) created based on use of the device. Additionally, the storage apparatus 60 may include a high-speed random-access memory and may further include a nonvolatile memory, such as at least one magnetic disk memory, a flash memory, or another nonvolatile solid-state memory. In some examples, the storage apparatus 60 may further include memories which are remotely disposed with respect to the processor 50. These remote memories may be connected to the receiving node through a network. Examples of the preceding network include, but are not limited to, the Internet, an intranet, a local area network, a mobile communication network and a combination thereof.

When the at least one program included in the preceding receiving node are executed by the at least one processor 50, the following operations are implemented: receiving header overhead; determining channel identification information according to the header overhead; and in the case where the channel identification information is successfully verified, binding a local optical layer channel according to the channel identification information.

Alternatively, when the at least one program included in the preceding receiving node are executed by the at least one processor 50, the following operations are implemented: acquiring channel identification information and binding a local optical layer channel according to the channel identification information.

The receiving node provided in this embodiment and the binding methods applied by a receiving node provided in the preceding embodiments belong to the same concept. For technical details not described in detail in this embodiment, reference may be made to any one of the preceding embodiments, and this embodiment has the same beneficial effects as the executed binding method applied by a receiving node.

Embodiments of the present application provide a storage medium containing computer-executable instructions which, when executed by a computer processor, are configured to execute a configuration method or a binding method.

The configuration method includes determining the multiplexing structure of an optical layer channel and configuring channel identification information for a target node according to the multiplexing structure. The channel identification information is used for instructing the target node to bind the optical layer channel.

The binding method includes acquiring channel identification information; binding a local optical layer channel according to the channel identification information; and encapsulating the channel identification information in header overhead, and sending the header overhead to a receiving node. The header overhead is used to instructing the receiving node to bind an optical layer channel.

Alternatively, the binding method includes receiving header overhead; determining channel identification information according to the header overhead; and in the case where the channel identification information is successfully verified, binding a local optical layer channel according to the channel identification information.

Alternatively, the binding method includes acquiring channel identification information and binding a local optical layer channel according to the channel identification information.

From the preceding description of embodiments, it is apparent to those skilled in the art that the present application may be implemented by relying on software and general-purpose hardware or may be implemented by hardware. Based on this understanding, the technical solutions of the present application may be embodied in the form of a software product. The software product in a computer may be stored in a computer-readable storage medium such as a floppy disk, read-only memory (ROM), random-access memory (RAM), flash memory, hard disk, or optical disk in the computer and includes multiple instructions for enabling a computer device (which may be a personal computer, a server, or a network device) to execute the configuration method or binding method described in any embodiment of the present application.

The above are only exemplary embodiments of the present application and are not intended to limit the scope of the present application.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology. The memory may be, for example, but not limited to, a read-only memory (ROM), a random-access memory (RAM), an optical storage apparatus and system (digital video disc (DVD) or compact disc (CD)) or the like. The computer-readable medium may include a non-transitory storage medium. The data processor may be of any type suitable to the local technical environment, such as, but is not limited to, a general-purpose computer, a special-purpose computer, a microprocessor, a digital signal processing (DSP), an application specific integrated circuit (ASIC), a field programmable gate array (FPGA), and a processor based on a multi-core processor architecture.

What is claimed is:

1. A configuration method, applied by a network management device, comprising:
    determining a multiplexing structure of an optical layer channel;
    configuring channel identification information for a target node according to the multiplexing structure, wherein the channel identification information is used for instructing the target node to bind a local optical layer channel, and binding the local optical layer channel comprises binding a local channel layer interface and a local subchannel layer interface to generate an interface address at an channel layer and an interface address at an optical tributary signal assembly (OTSiA) layer for creating an optical layer path; and
    delivering the channel identification information to the target node.

2. The method according to claim 1, wherein the target node comprises a sending node; and
    the sending node and a corresponding receiving node have an overhead channel used for transmitting the channel identification information.

3. The method according to claim 2, wherein the channel identification information comprises following information of the sending node:
    an optical layer adaptation interface local identifier;
    a number of channels contained in an optical layer;
    a channel local identifier;
    a number of subchannels contained in a channel;
    a subchannel local identifier; and
    a subchannel peer-end local identifier.

4. The method according to claim 1, wherein the target node comprises a sending node and a receiving node; and
    configuring the channel identification information for the target node according to the multiplexing structure comprises:
    configuring corresponding channel identification information for each target node according to the multiplexing structure.

5. The method according to claim 4, wherein the channel identification information corresponding to the each target node comprises following information of the each target node:
    an optical layer adaptation interface local identifier;
    a number of channels contained in an optical layer;
    a channel local identifier;
    a number of subchannels contained in a channel; and
    a subchannel local identifier.

6. A device, comprising:
    at least one processor; and
    a storage apparatus configured to store at least one program, wherein
    when executed by the at least one processor, the at least one program causes the at least one processor to implement the configuration method according to claim 1.

7. A non-transitory computer-readable storage medium storing a computer program, wherein the computer program, when executed by a processor, implements the configuration method according to claim 1.

8. A binding method, applied by a sending node, comprising:
    acquiring channel identification information from a network management device, wherein the channel identification information is configured by the network management device according to a multiplexing structure of an optical layer channel; and
    binding a local optical layer channel according to the channel identification information, wherein binding the local optical layer channel comprises binding a local channel layer interface and a local subchannel layer interface to generate an interface address at an channel layer and an interface address at an optical tributary signal assembly (OTSiA) layer for creating an optical layer path.

9. A sending node, comprising:
    at least one processor; and
    a storage apparatus configured to store at least one program, wherein
    when executed by the at least one processor, the at least one program causes the at least one processor to implement the binding method according to claim 8.

10. The method according to claim 8, wherein the channel identification information comprises following information of the sending node:
    an optical layer adaptation interface local identifier;
    a number of channels contained in an optical layer;
    a channel local identifier;
    a number of subchannels contained in a channel; and
    a subchannel local identifier.

11. A non-transitory computer-readable storage medium storing a computer program, wherein the computer program, when executed by a processor, implements the binding method according to claim 8.

12. A binding method, applied by a receiving node, comprising:
    acquiring channel identification information from a network management device, wherein the channel identification information is configured by the network management device according to a multiplexing structure of an optical layer channel; and
    binding a local optical layer channel according to the channel identification information, wherein binding the local optical layer channel comprises binding a local channel layer interface and a local subchannel layer interface to generate an interface address at an channel layer and an interface address at an optical tributary signal assembly (OTSiA) layer for creating an optical layer path.

13. A receiving node, comprising:
    at least one processor; and
    a storage apparatus configured to store at least one program, wherein
    when executed by the at least one processor, the at least one program causes the at least one processor to implement the binding method according to claim 12.

14. The method according to claim 12, wherein the channel identification information comprises following information of the receiving node:

an optical layer adaptation interface local identifier;
a number of channels contained in an optical layer;
a channel local identifier;
a number of subchannels contained in a channel; and
a subchannel local identifier.

15. A non-transitory computer-readable storage medium storing a computer program, wherein the computer program, when executed by a processor, implements the binding method according to claim 12.

* * * * *